UNITED STATES PATENT OFFICE 1,997,782

MANUFACTURE OF CEMENT

Robert Erwin Windecker, Painesville, Ohio

No Drawing. Application March 7, 1931,
Serial No. 521,008

4 Claims. (Cl. 106—24)

This invention relates to the manufacture of cement which has the physical property of quick hardening or of higher strength in one and three day tests than ordinary Portland cement. The object of this invention is to provide a process for producing high early strength cement by a less complicated and less costly method than those processes heretofore employed in its manufacture.

This invention relates to the process of manufacturing a cement with high early strength properties from average or ordinary Portland cement clinker of good quality and from cement clinker of lime content which is higher than that ordinarily found in Portland cement clinker.

It is well known that the addition of ground quick or hydrated lime to cement produces a quickening of the hardening properties of a cement thus manufactured. It is also a well known fact that the addition of small amounts of inorganic salts to cement, for example calcium chloride, produces quicker hardening and other valuable properties in Portland cement thus treated. The grinding of cement clinker produces varying strengths, depending upon the fineness to which the clinker is ground. Ordinary Portland cement is usually ground to a fineness varying from 88% to 92% passing a standard 200-mesh sieve. Finer grinding is known to produce quicker hardening properties somewhat in proportion to the fineness to which it is ground, within certain limits.

A cement of superior high early strength and other physical properties is produced according to this invention from ordinary Portland cement clinker of varying lime content by the addition during or after grinding of a small amount of quick or hydrated lime, together with a small percent of a soluble inorganic salt, for example calcium chloride or sodium sulfate in addition to the regular use of gypsum. It is preferable that the lime, soluble salt and gypsum be ground with the clinker to produce cement. However this is not essential and these materials or part of them may be ground to a suitable fineness and mixed or blended with the cement at any time before use. The grinding process of the clinker and additions is preferably continued to a fineness exceeding that of normal Portland cement and the grinding may be extended to a degree which, when a clinker of good quality is used, will produce a cement which meets or exceeds in strength the specifications for high early strength cement.

The amounts of lime added to the cement clinker according to the invention may be varied according to the amount of combined calcium oxide already present in the cement clinker, and also according to the degree of quick hardening properties required. As much as 4% to 5% of quick lime may be added to the clinker without producing an unsound condition in the cement thus manufactured. The amount of lime added according to the invention may be varied from 0.5% to 5.0% calcium oxide to produce varying properties. In general, with cement clinker of high quality, 1.5% to 2.5% of calcium oxide by weight of clinker is sufficient to produce high early strength cement when used in conjunction with other materials hereinbefore mentioned.

The quantity of soluble inorganic salt added to the cement clinker may differ according to the physical properties required in the cement to be produced, and may be varied from 0.3% to 4.0%, based on the weight of anhydrous salt and on the weight of the clinker. In general, for high quality clinker, the amount of soluble salt used may vary from 0.5% to 1.5%, based on the weight of the clinker.

According to the invention, an inorganic soluble salt may be employed in this process, which when used with lime additions to the cement clinker, will produce in the cement thus manufactured the additional physical property of quick hardening or high early strength. Examples of such soluble salts are commercial solid calcium chloride, salt cake, or sodium sulfate, sodium sulfate is, however, preferred since it is found that the sulfate gives far superior results. This soluble salt is preferably ground with the clinker, lime and gypsum, but may be added as a solid or in solution at the time of concrete mixing, also both the lime and soluble salt may be added to the cement at any time before use.

According to the invention, a cement clinker of varying lime content may be ground with sodium sulfate, salt cake or any other soluble or partially soluble sulfate without other additions except retarders, such as gypsum or anhydrite to produce hydraulic cement with high early strength properties.

The amount of sulfate added to the cement clinker according to the invention varies from 0.3% to 4.0%, based on the weight of the clinker and upon the calculated weight of anhydrous sulfate. In general, the most advantageous proportions are 100 parts clinker, 0.5 to 1.5 parts soluble sulfate, 3.5 to 2.4 parts gypsum.

According to the invention, the soluble sulfate may be added at any time before or during the mixing of concrete. It is preferable to grind the soluble sulfate with the clinker and retarder to produce a finished hydraulic cement.

The cement clinker used to produce this hydraulic cement according to the invention should have such a lime content that the ratio of lime to silica, iron and alumina will exceed 2.10. This ratio may preferably range between 2.20 to 2.50 to produce a hydraulic cement of very quick hardening properties or high early strength.

I have discovered that white hydraulic cement having high early strength properties may be produced according to this invention by the addition of the soluble sulfate hereinabove mentioned or by the addition of lime and the soluble sulfate in addition to the ordinary use of gypsum.

According to the invention, the amount of soluble sulfate used may be varied between 0.4% and 4.0%, based upon the weight of anhydrous salt and upon the weight of white cement clinker, when the soluble salt is used alone with the clinker and gypsum. The proportions of materials when lime is used with the soluble sulfate may vary between the limits of 100 parts white Portland cement clinker, 0.4% to 4.0% soluble sulfate, 0.4% to 5.0% lime and an appropriate quantity of gypsum retarder to produce a white hydraulic cement having high early strength properties.

It is understood that, in order to produce high early strength cement, a cement clinker must be used which is of good quality. It cannot be expected that an inferior clinker which would ordinarily produce at once or after aging an inferior Portland cement could be used to produce a high early strength cement of high quality.

I claim:

1. The method of producing hydraulic cement of high early strength and quick hardening properties which comprises grinding hydraulic cement clinker, having a lime modulus above 2.10 with neutral sodium sulfate and lime.

2. The method of producing hydraulic cement of high early strength and quick hardening properties which comprises grinding a mixture of hydraulic cement clinker, having a lime modulus above 2.10 with a soluble neutral sulfate and lime.

3. The method of producing hydraulic cement of high early strength and quick hardening properties which comprises grinding hydraulic cement clinker, having a lime modulus above 2.10 with a 0.4% to 1.5% of a soluble neutral sulfate and 0.5% to 5% of lime.

4. A high early strength and quick hardening hydraulic cement as the product of incorporating hydraulic cement clinker, having a lime modulus over 2.10, a soluble neutral sulfate and lime.

ROBERT ERWIN WINDECKER.